(12) United States Patent  
Hoashi (10) Patent No.: US 6,746,177 B1
(45) Date of Patent: Jun. 8, 2004

(54) BLOCK AND A RIPARIAN IMPROVEMENT STRUCTURE INHABITABLE FOR AQUATIC LIFE

(75) Inventor: Kenpachi Hoashi, Tokyo (JP)

(73) Assignee: Bousai Corporation, Tokyo (JP)

( * ) Notice: Subject to any disclaimer, the term of this patent is extended or adjusted under 35 U.S.C. 154(b) by 0 days.

(21) Appl. No.: 09/525,772

(22) Filed: Mar. 14, 2000

(51) Int. Cl.[7] .................................................. E02B 3/04
(52) U.S. Cl. ............................ 405/15; 405/16; 405/19; 405/21; 405/64; 405/107; 52/606
(58) Field of Search ............................ 405/15, 16, 17, 405/18, 19, 20, 21, 33, 35, 25, 27, 30, 39, 49, 64, 80, 81, 118, 107; 52/606

(56) References Cited

U.S. PATENT DOCUMENTS

| | | | | |
|---|---|---|---|---|
| 219,899 A | * | 9/1879 | Bangs et al. ................... | 405/32 |
| 1,529,317 A | * | 3/1925 | Ludeman | |
| 1,683,441 A | * | 9/1928 | Bone | |
| 2,833,532 A | * | 5/1958 | Ries | |
| 3,811,287 A | * | 5/1974 | De Winter ..................... | 405/19 |
| 3,894,397 A | * | 7/1975 | Fair .............................. | 405/33 |
| 4,286,895 A | * | 9/1981 | Poli et al. ...................... | 405/17 |
| 4,436,447 A | * | 3/1984 | Crowe .......................... | 406/16 |
| 4,479,740 A | * | 10/1984 | Schaaf et al. .................. | 405/30 |
| 5,160,215 A | * | 11/1992 | Jensen .......................... | 405/46 |
| 5,906,456 A | * | 5/1999 | Knight .......................... | 405/20 |

FOREIGN PATENT DOCUMENTS

| | | | | |
|---|---|---|---|---|
| JP | 2000-87335 | * | 3/2000 | ............. E02B/3/14 |
| JP | 2000-273839 | * | 10/2000 | ............. E02B/3/08 |

* cited by examiner

*Primary Examiner*—David Bagnell
*Assistant Examiner*—Katherine Mitchell
(74) *Attorney, Agent, or Firm*—Shanks & Herbert (57) ABSTRACT

The riparian improvement structure for use upon riparian protection, shore and bank protection, wave control, water control, etc. of a river, lake, sea, etc. is composed of a plurality of blocks and a structural body or bodies composed of a plurality of wooden materials or mass materials. The riparian improvement structure also provides an environment suitable for the habitation of aquatic life such as fish, crustaceans, e.g., crabs, shrimps, aquatic insects, etc., and for the growth of aquatic plants, etc. The blocks are each provided with a water passage, such as a through-hole formed therein or a plurality of grooves formed on the bottom thereof, through which fresh water can flow, when they are disposed on the structural body or bodies or on a riparian area such as a river-bed, shore, bank, bottom, etc. of a river, lake, sea, etc. The blocks are disposed for fresh water to flow through the water passage and to be supplied to the structural body or bodies inhabitable for aquatic life. The blocks are further disposed in a relationship spaced away from each other forming a space therebetween and the space is also useful for the supply of a fresh water to the structural body or bodies.

28 Claims, 12 Drawing Sheets

BLOCK AND A RIPARIAN IMPROVEMENT STRUCTURE INHABITABLE FOR AQUATIC LIFE

CROSS-REFERENCE TO RELATED APPLICATION

The entire disclosure of Japanese Patent Application No 10-260,657 filed on Sep. 14, 1998, including specification, claims, drawings and summary is incorporated by reference in its entirety.

BACKGROUND OF THE INVENTION

1. Field of the Invention

The present invention relates to a block and a riparian improvement structure inhabitable for aquatic life. More particularly, the present invention relates to a block to be laid on the bottom surface of a river, lake or sea, etc., or at the shore or ridge thereof, upon embankment construction for foot protection, river protection, breaking of water, water stream control, etc. Moreover, the present invention relates to a riparian improvement structure made of such blocks so as to provide a riparian area such as a river-bed, bottom, shore, bank, etc. of a river, lake or sea, etc. with an environment suitable for habitation and/or growth of aquatic life.

2. Description of the Related Art

Riparian improvement construction work is being carried out in many cases with the object to protect the inhabitants of a riparian area of a river, lake or sea, etc. from flood, high tide, etc. In order to achieve the object, the riparian improvement construction is implemented with the measures, for instance, to expand a water passage of a river, etc. to make a meandering water channel straight so as to allow water to flow faster down to sea, etc. and to flatten rapids or deep pool of a river, lake, sea, etc. so as to allow water to flow smoothly.

The above riparian improvement measures may comprise conventional riparian improvement work for foot protection, river protection, breaking of water, water stream control, etc. The riparian improvement work includes: an old construction process utilizing wood materials composed of sticks, twigs, round timber, etc. or stone materials; and a modern construction process utilizing concrete blocks, etc.

The construction process utilizing wooden materials may comprise tightening a bundle of round timbers or sticks, twigs, etc., sinking the bundle of wooden materials on the bottom of a river, lake, sea, etc., and placing a weight such as cobblestones, etc. on the bundle of the wooden materials sunken, thereby making the earth and sand on the river-bed, etc. unlikely to be exposed directly to a water flow to prevent the earth and sand from being carried or washed away. An alternative construction process may comprise hammering wooden piles into the river-bed, bank, shore, etc. of a river, lake, sea, etc. for bank protection. These construction processes utilizing wooden materials are currently suffering from the growing difficulty of collecting wooden materials such as sticks, twigs, round timbers, etc. Further, these processes have the problems that they require special skills for tightening sticks, twigs, round timbers, etc., into a whole constructed unit and, as a result, a period of construction becomes prolonged and construction costs are made expensive.

On the other hand, a concrete block construction process may comprise laying concrete blocks on the river-bed, shore, bank, etc. of a river, lake, sea, etc. to prevent the earth and sand from being carried or washed away. This construction process has no problems as the construction process utilizing the wooden materials has, so that the concrete block construction process is recently being extensively applied.

Moreover, the concrete block construction process can provide the advantages of shortening a period of construction and withstanding a rapid water stream of a river, etc. at a sufficiently high level of resistance. This construction process, however, suffers from the drawbacks that concrete blocks change the ecological system of the riparian area and the place where they are laid is no longer inhabitable with aquatic life such as fish, crustaceans, e.g., crabs, shrimps, aquatic insects, etc. and suitable for the growth of aquatic plant, etc.

SUMMARY OF THE INVENTION

In order to solve the problems inherent in the conventional construction processes, the present invention has the object to provide a block adapted to form a riparian improvement structure that can improve the riparian area of a river, lake, sea, etc. as well as to provide the riparian area with an environment suited for aquatic life to live in or grow.

Further, the present invention has the object to provide the riparian improvement structure suitable for habitation and/or growth of aquatic life in the riparian area of a river, lake, sea, etc.

In order to achieve the object, the present invention provides a block that can form an inhabitable place for aquatic life, a plurality of the blocks being disposed on a structural body inhabitable for aquatic life, which in turn is disposed in the riparian area, such as a bottom, shore, bank, etc. of a river, lake, sea, etc.

Further, the present invention provides a riparian improvement structure comprising a structural body inhabitable for aquatic life disposed in the riparian area of a river, lake, sea, etc. and a plurality of blocks disposed on the structural body, the block in turn being suitable for habitation and/or growth of aquatic life.

The riparian improvement structure according to the present invention can provide an inhabitable place for aquatic life in the riparian area of a river, lake, sea, etc. and protect an environment suitable for the habitation and/or growth of aquatic life. Further, the riparian improvement structure can cover the bottom, shore, bank, etc. of a river, lake, sea, etc. by laying a plurality of the blocks on the structural body as well as accomplish the foot protection, bank protection, wave control, water control, and so on. Moreover, the blocks disposed on the structural body can serve as preventing the structural body from being carried away even if a water flow would become rapid or if a flood, high tide, etc. would occur.

Furthermore, the riparian improvement structure according to the present invention comprises a block interposed between the bottom, shore, etc. of a river, lake, sea, etc. and an inhabitable structural body. The block disposed in this state can also present the effects similar to or identical to the effects that the riparian improvement structure in the previous mode can.

The block according to the present invention may preferably be provided with a water passage that allows water to pass or flow therethrough when it is disposed on or below the inhabitable structural body. The block with this structure can provide an environment in or by itself which is suitable for the habitation and/or growth of aquatic life.

On the other hand, the structural body may be composed of a bundle of a plurality of wooden materials, such as round timbers, sticks, twigs, bamboo, etc. or a plurality of mass bodies such as natural rock, stone, concrete, etc. disposed in a spaced relationship. The structural body can provide an environment suitable for the habitation and/or growth of aquatic life, particularly when combined with the blocks laid on the structural body or interposed between the structural body and the bottom, shore, bank, etc. of a river, lake, sea, etc.

Further, the blocks may preferably be laid for their flow passages to be directed in the water flow direction of the river, lake, sea, etc. and to allow water to flow or pass therethrough along the water direction of the flow of the water in a river, lake, sea, etc. This disposition of the blocks allows water to flow or passage through the riparian improvement structure in the water flow direction to accelerate the exchanges of water within the riparian improvement structure and, at the same time, can always supply the riparian improvement structure with a fresh water having a sufficient amount of dissolved oxygen that is essential to the aquatic life, thereby giving an environment suitable for the habitation and/or growth of aquatic life.

Moreover, the water flow passage of the block may be of a structure in which it is formed on the bottom surface in the form of a groove or a through-hole extending along or substantially parallel to the flow direction of water in a river, lake, sea, etc. The water flow passage of the block allows the water to flow or pass therethrough to provide a fresh water to the riparian improvement structure and accelerate the metabolism of water, thereby making the riparian improvement structure suitable for the habitation and/or growth of aquatic life.

It is further preferred that the blocks are disposed in a relationship spaced in a given distance from each other. Further, the blocks may preferably be disposed so as for the through-hole to become open at a space formed between the adjacent blocks upon laying a plurality of the blocks in the riparian area of a river, lake, sea, etc. The spaced arrangement of the blocks can permit sun light to reach the inside of the riparian improvement structure, thereby promoting aquatic plant to grow thick and consequently providing fish, crustaceans, e.g., crabs, shrimps, aquatic insects, etc. with an inhabitable place.

Moreover, the blocks may preferably be joined with an appropriate joint member such as wires so as for the adjacent blocks to become variable in the relative positions. The joining of the blocks with each other can make the resulting riparian improvement structure integral and more secure so that the function of the riparian improvement structure can be kept effective for a prolonged period of time as time elapse and even after the inhabitable structural body would have become decayed or changed its position.

Other objects, features and advantages of the present invention become apparent in the course of the description that follows, with respect to the accompanying drawings.

DESCRIPTION OF THE PREFERRED EMBODIMENTS

The present invention will be described in more detail by way of embodiments with reference to the accompanying drawings.

Figure 1:
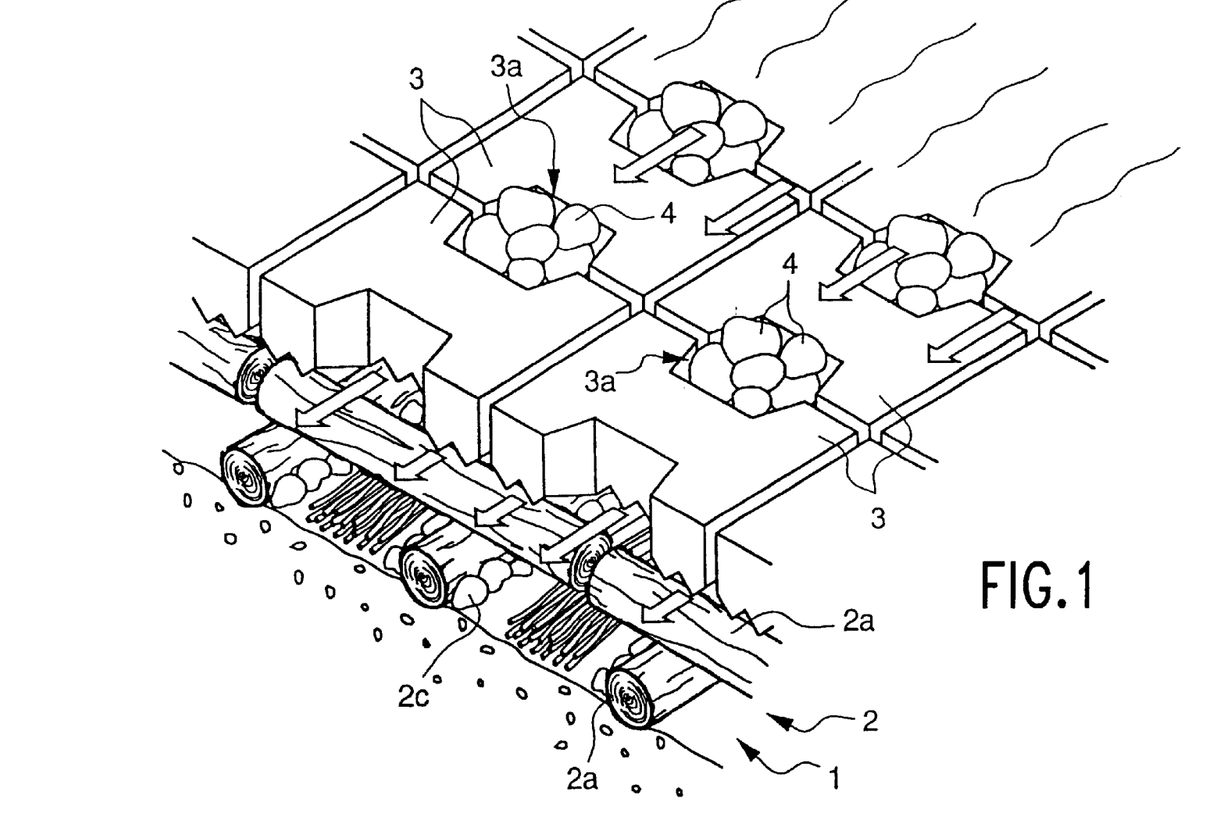
FIG. 1 is a perspective view in section showing a riparian improvement structure laid for use in the foot protection of a river, etc. in accordance with an embodiment of the present invention.

FIG. 1 shows a riparian improvement structure to be disposed mainly for use in the foot protection in improvement work of a river or the like. As shown in FIG. 1, the riparian improvement structure comprises a structural body 2 inhabitable for aquatic life disposed on a riparian area 1 and a plurality of blocks 3 laid on the inhabitable structural body 2. The blocks 3 may function as a weight for the inhabitable structural body 2, thereby preventing the components of the inhabitable structural body 2 from being broken or destroyed or carried or washed away by rapid water flow such as flood, high tide, etc.

The inhabitable structural body 2 comprises a plurality of round timbers 2a arranged and joined in the form of a lattice and a bundle of sticks and twigs 2b, etc. and/or cobblestones 2c, etc. disposed between the round timbers 2a. The inhabitable structural body 2 is disposed on the river-bed I for foot protection, etc. as well as for habitation and/or growth of aquatic life. The blocks 3 are made each from concrete in a generally I-shaped or H-shaped form and disposed in a side-by-side arrangement to form a generally rectangular space 3a in combination with the adjacent block 3. The space 3a formed on the sides of the adjacent blocks 3 may be filled with cobblestones 4 or the like. The cobblestones 4 can also serve as a weight for the inhabitable structural body 2 as well as an inhabitable place for aquatic life.

Figure 2A:
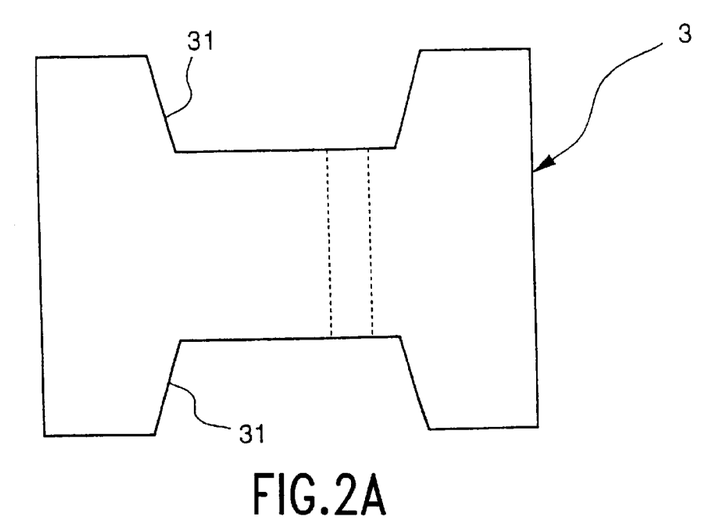
FIG. 2(a) is a plan view of a single body of a block and FIG. 2(b) is a perspective view of the bottom surface of the block when viewed from the bottom.
Figure 2B:
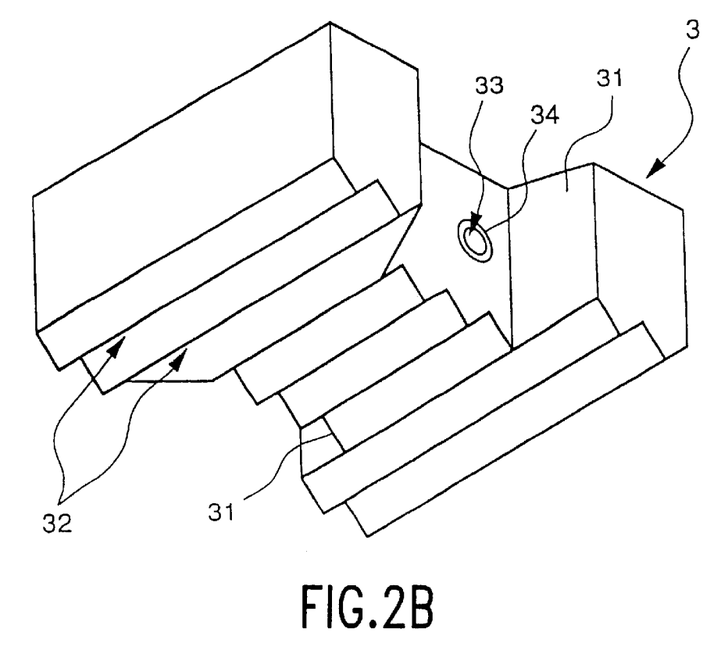

FIG. 2(a) shows a single body of a block and FIG. 2(b) shows the bottom surface of the block 3. As shown in FIG. 2(a), the block 3 may be in a generally I-shaped or H-shaped form, when viewed from the top, in which each of the both side portions is depressed to form a depressed side portion 31. A through-hole 33 may be formed in the block 3 so as to communicate with the both side portions 31 through which water can flow or pass. Further, the through-hole 33 may be formed at any location, and it may preferably be formed at a location of the block 3 somewhat far from its central portion, or, at a location deviated somewhat from its central portion. A bamboo tube 34 (FIG. 2(b)) may be inserted into each of the hole ends of the through-hole 33 in order to provide a more natural environment.

As shown in FIG. 2(b), the block 3 may be formed at its bottom surface with a plurality and a series of V-shaped grooves 32, each extending preferably parallel to the through-hole 33. Further, the block 3 may preferably be disposed so as for the V-shaped grooves 32 to comply with the flow direction of water in a river, etc., allowing the water to flow or pass through the grooves 32, when laid on the river-bed 1, etc. The V-shaped grooves 32 may be formed on the entire bottom surface continually and consecutively. It should be understood that the grooves 32 of the block 3 may be each of any shape, size, etc.

Figure 3:
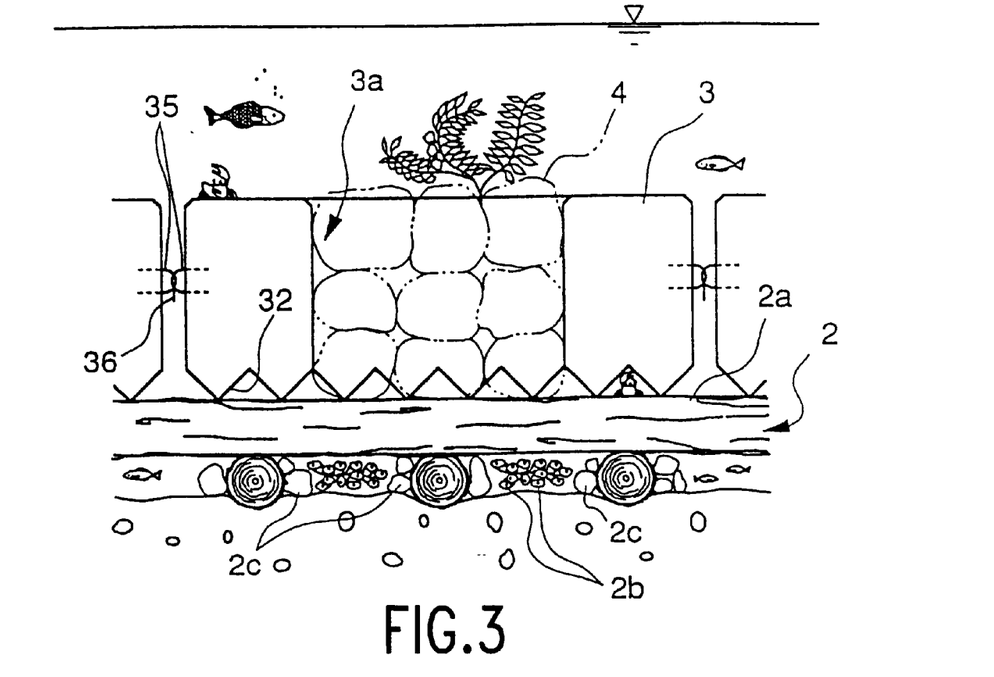
FIG. 3 is a side view in section of a riparian improvement structure disposed in a river, etc. in accordance with an embodiment of the present invention.

FIG. 3 is a side view in section showing an example in which the blocks 3 are arranged in a relationship spaced in a given distance with the grooves 32 formed on the bottom surface, and they are disposed on the inhabitable structural body 2 on the river-bed 1 or the like of a river, lake, sea, etc. As shown in FIG. 3, the block 3 may be provided with an anchor 35 on the side thereof so that, when the blocks 3 are disposed in a side-by-side arrangement on the inhabitable structural body 2, the adjacent blocks 3 are joined to each other with a fastening member such as a shackle 36, etc.

Figure 4:
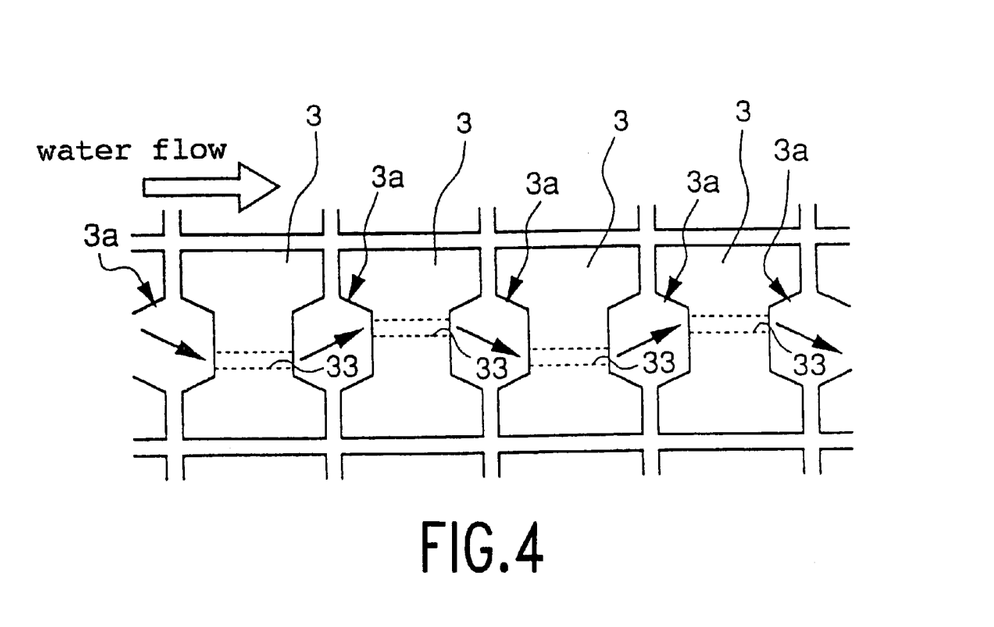
FIG. 4 is a schematic plan view showing the disposition of blocks and a water flow through through-holes formed in each of the blocks in accordance with an embodiment of the present invention.

As shown in FIG. 4, it is preferred that the blocks 3 are disposed with their through-holes 33 arranged in a stepwise or manner. More specifically, the blocks 3 may be disposed with their adjacent sides, i.e., their adjacent depressed side portions, facing each other to form the space 3a and further with the through-holes 33 arranged in a stepwise manner, that is, with the through-hole 33 of the block 3 arranged above or below the through-hole 33 of the adjacent block 3, when viewed from the top. In other words, the water passed through the through-hole 33 of the block 3 and discharged from the exit of the through-hole 33 thereof flows upward or downward through the space 3a interposed between the depressed side portions 31 of the adjacent blocks 3 into the inlet of the through-hole 33 of the adjacent block 3.

Figure 5:
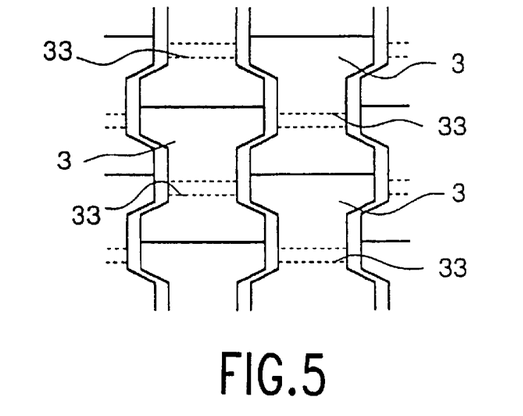
FIG. 5 is a plan view showing another example of the disposition of blocks.

FIG. 5 shows another example of the disposition of the blocks 3. As shown in FIG. 5, a first row of the blocks 3 is configured in such a manner that a first block 3 is disposed with the top face portion thereof arranged so as to be in contact with or face the bottom face portion of a second block 3 disposed above the first block 3 and with the bottom face portion thereof arranged so as to be in contact with or face the top face portion of a third block 3 disposed below the first block 3, when viewed from the top. Furthermore, a second row of the blocks 3 is configured in substantially the same manner as the first row of the blocks 3 and the first row thereof is disposed along and parallel to the second row thereof, preferably with a clearance spaced in a given distance from each other. The first and second rows of the blocks 3 are arranged such that the upper flange portion of the first block 3 of the first row is disposed in a lower half section of the depressed side portion 31 of the first block 3 of the second row adjacent the first row and that the lower flange portion of the first block 3 of the first row is disposed in an upper half section of the depressed side portion 31 of the third block 3 of the second row disposed below the first block 3 of the second row. Similarly, the lower flange portion of the second block 3 of the first row disposed above the first block 3 thereof is arranged in an upper half section of the depressed side section 31 of the first block 3 of the second row and the upper flange portion of the third block 3 of the first row disposed below the first block 3 thereof is arranged in a lower half section of the depressed section 31 of the third block 3 of the second row disposed below the first block 3 of the second row.

In other words, the blocks 3 of the first row disposed adjacent to the blocks 3 of the second row in the embodiment as shown in FIG. 5 is configured such that the first projection portion consisting of the upper flange portion of the first block 3 and the lower flange portion of the second block 3 disposed on the upper side of and adjacent to the first block 3 is arranged in the cut-away or depressed side portion 31 of the first block 3 of the second row disposed adjacent to the first row of the blocks 3 and, likewise, the second projection portion consisting of the lower flange portion of the first block 3 and the upper flange portion of the third block 3 disposed on the bottom side of and adjacent to the first block 3 is arranged in the cut-away or depressed side portion 31 of the third block 3 of the second row disposed on the bottom side of and adjacent to the first block 3 of the second row. On the other hand, the third projection consisting of the lower flange portion of the first block 3 of the second row and the upper flange portion of the third block 3 of the second row disposed on the bottom side of the first block 3 is likewise arranged in the space of the cut-away or depressed side portion of the first block 3 of the first row. The other blocks 3 of the first and second rows are arranged in substantially the same manner as described immediately above.

Likewise, other rows of the blocks 3 are arranged in substantially the same manner as the first and second rows of the blocks 3.

Moreover, as shown in FIG. 5, the water passed through the through-hole 33 of the first block 3 of the first row flows along the clearance interposed between the first and second rows of the blocks 3 and enters into the through-hole 33 of the first block 3 of the adjacent second row. Likewise, the water entered into and passed through the through-hole 33 of the first block 3 of the second row flows along a clearance arranged in combination with the adjacent row of the blocks 3. This mode of the water flow can be applied to the arrangement of the other blocks in other embodiments of this invention.

With the arrangement of the riparian improvement structure according to the present invention, the foot protection and the other objects of the present invention can be accomplished by laying the blocks 3 on the inhabitable structural body 2 placed on a riparian area 1, such as a bottom, shore, bank, etc. of a river, lake, sea, etc. The riparian improvement structure according to the present invention can also provide a space that becomes a good place suitable for the habitation and/or growth of aquatic life such as fish, crustaceans, e.g., crabs and shrimps, aquatic insects, etc. and aquatic plant, etc., particularly by laying the inhabitable structural body 2 on the riparian area 1. Moreover, the inhabitable structural body 2 can be supplied with fresh water through the grooves 32 and the through-holes 33 formed on the blocks 3, thereby forming the riparian improvement structure as a good environment suitable for the habitation and/or growth of such aquatic life.

For instance, the structural body 2 may be composed of various materials such as, for example, round timbers 2a, sticks and twigs 2b, cobblestones 2c, etc., so that spaces around such materials can become a place that is inhabitable for aquatic life such as aquatic animals, e.g., as fish, crustaceans, e.g., crabs and shrimps, aquatic insects, etc. and that is appropriate for growth of aquatic plants such as algae, seaweed, diatoms, etc., for instance, as shown in FIGS. 1 and 3. Moreover, the space 3a formed by the depressed side portions 31 of the adjacently disposed blocks 3 may be filled with cobblestones 4, etc., for instance, as shown in FIGS. 1 and 3. The space 3a filled with the cobblestones 4 can also provide a place inhabitable for such aquatic life.

The riparian improvement structure according to the present invention in the embodiments as described above is configured such that a plurality of the blocks 3 are laid on the structural body 2 and the blocks 3 are connected tightly to each other through an anchoring member with the aid of a fastening member, so that the blocks 3 become unlikely to be carried away by a rapid stream such as flood, high tide, etc. and they can also prevent the inhabitable structural body 2 from being washed away. and protect an inhabitable environment for aquatic life. Furthermore, the riparian improvement structure according to the present invention can protect a natural environment even upon river improvement, etc.

A description has been made of the embodiment of the present invention in which the riparian improvement structure comprising a layer of the structural body 2 and a layer of the blocks 3 laid on a bottom, shore, bank, etc. of a river, lake, sea, etc. It can be apparently understood, however, that the present invention is not construed in any respect to be restricted to the embodiment as described above and the present invention encompasses any modifications and variations within the scope and spirit of the invention. For instance, the structural body 2 may be composed of cobblestones, concrete masses, etc., in spite of wooden materials such as round timbers, sticks, twigs, etc. As a matter of course, for instance, the structural body 2 may be appropriately disposed or selected depending upon an environment where the riparian improvement structure is to be disposed, the kind, size, etc. of aquatic life living or growing around such an environment, and so on. Furthermore, the structural body 2 may be composed of two or more layers depending upon the depth of a river, lake, sea, etc. or upon the kind, size, etc. of aquatic life living in or growing in the riparian area of a river, lake, sea, etc. where the structural body 2 is to be disposed.

Figure 6:
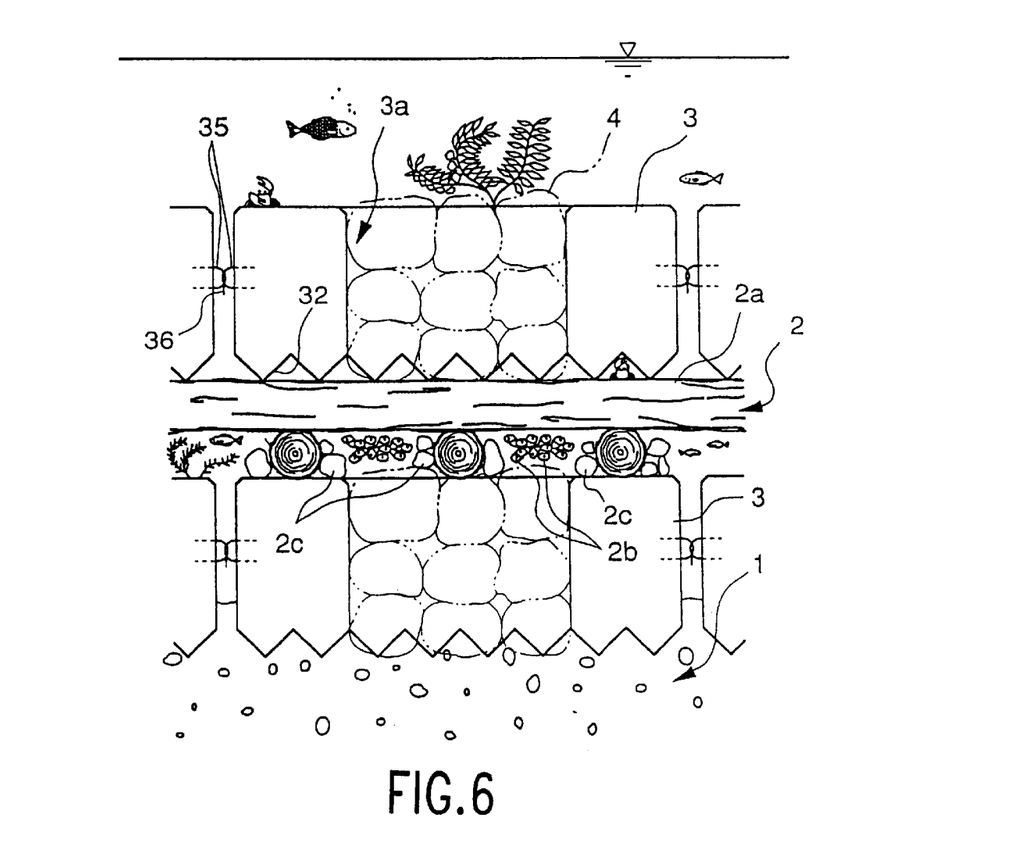
FIG. 6 is a side view in section showing the configuration of a riparian improvement structure in accordance with another embodiment of the present invention.

Moreover, the arrangement of the blocks 3 is not restricted to that as shown in FIG. 4 and includes any modifications and variations as long as they can accomplish the objects sought to be achieved by the present invention. For instance, as shown in FIG. 6, the riparian improvement structure according to the present invention may comprise the structural body 2 interposed between the two layers of the blocks 3, the lower layer of the blocks being laid on the riparian area 1.

Figure 7:
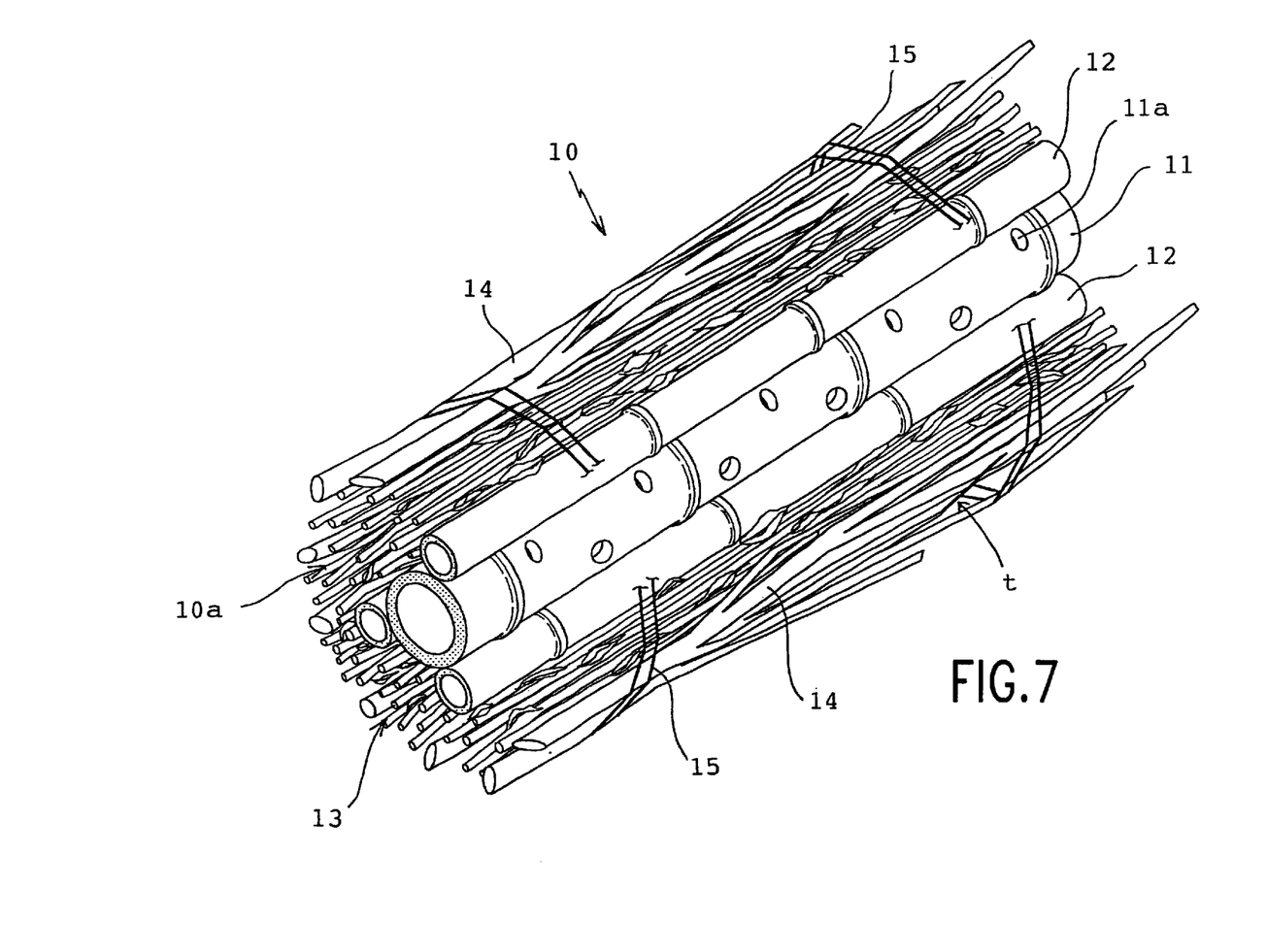
FIG. 7 is a perspective view of another example of a structural body to be used for the present invention.

FIG. 7 shows another example of an inhabitable structural body 10 for use with the riparian improvement structure of the present invention, which has substantially the same structure as the inhabitable structural body 2 in the embodiments according to the present invention as described above. As shown in FIG. 7, the structural body 10 comprises a bundle of a thick-stemmed bamboo tube 11 and bamboo tubes 12 including, e.g., small-sized bamboo tubes with diameters less than the diameter of a thick-stemmed bamboo tube, sticks and twigs 13, bushes 14, etc., the bamboo tubes and the sticks, twigs, bushes, etc. being bundled with wires 15 or any other fastening member and disposed at an outer periphery portion 10a of the thick-stemmed bamboo tube 11. There are a great number of gaps t of different sizes in a bundle of the various sticks and twigs 13, bushes 14, etc., where fish, crabs, shrimps, aquatic insects can live and aquatic plants can grow. Therefore, the outer periphery portion 10a of the structural body 10 can serve as a place where aquatic life lives in, lays eggs, escapes from other aquatic life, or grows.

Further, the thick-stemmed bamboo tube 11 may be provided with the small holes 11a through which the inside of the thick-stemmed bamboo tube 11 communicates with the outer periphery portion 10a of the inhabitable structural body 10 and the water passing through the thick-stemmed bamboo tube 11 can also flow into the outer periphery portion 10a thereof, thereby supplying a fresh water to the aquatic life living or growing therein.

Figure 8:
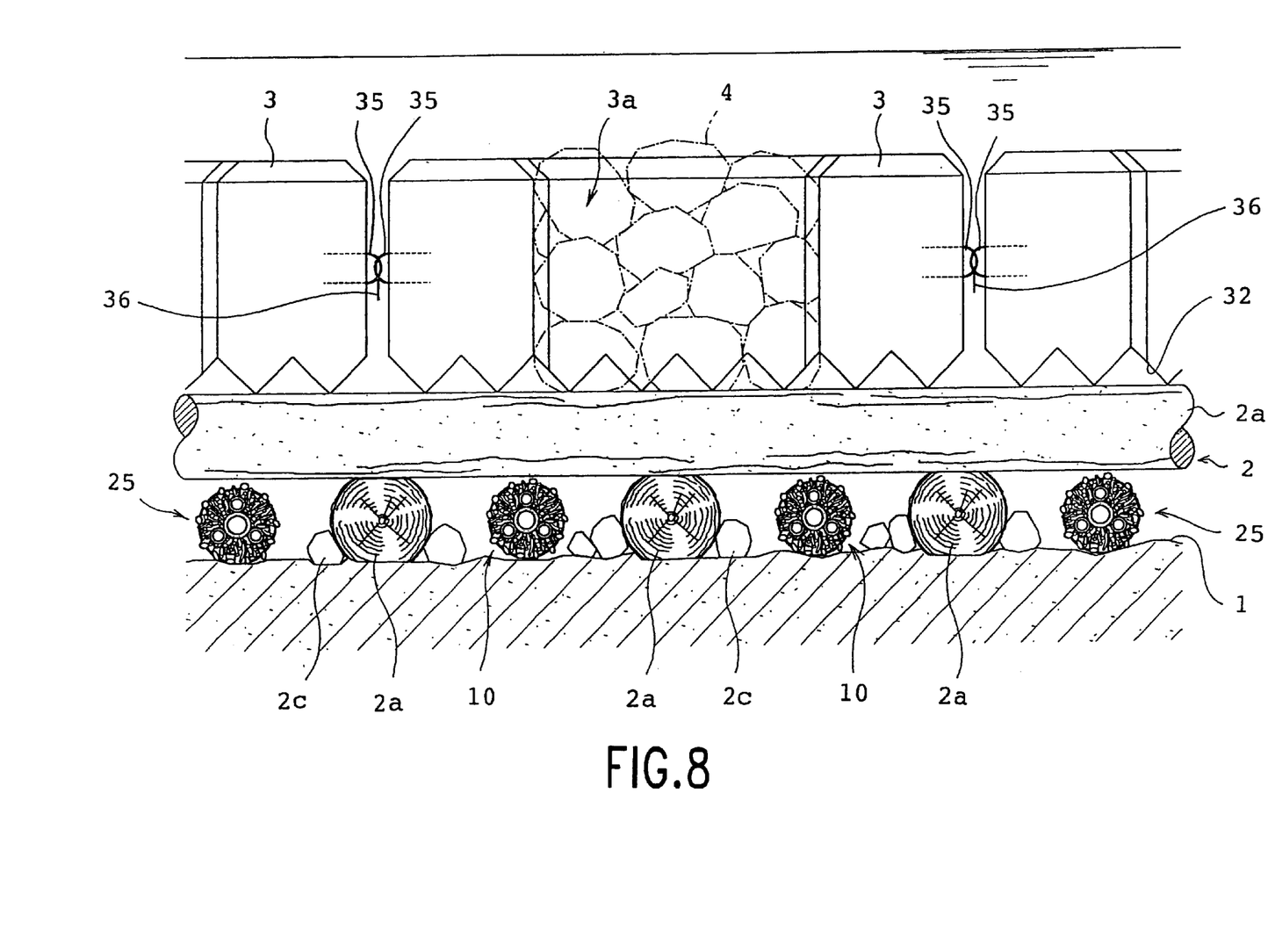
FIG. 8 is a schematic side view showing the disposition of the structural body of FIG. 7 in combination with the blocks.
Figure 9A:
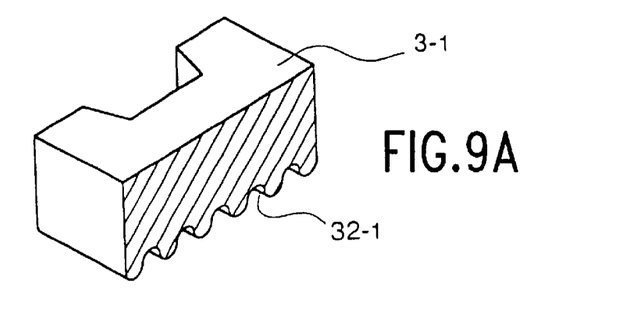
FIG. 9 is a perspective view in section showing examples of grooves disposed on the block.
Figure 9B:
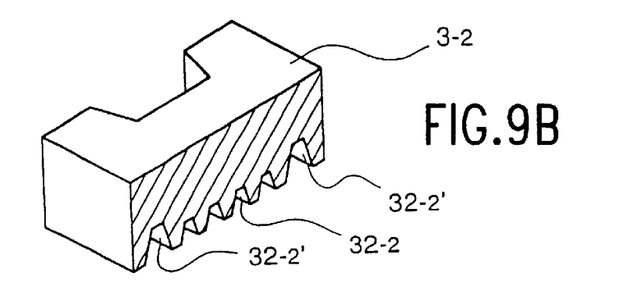
Figure 9C:
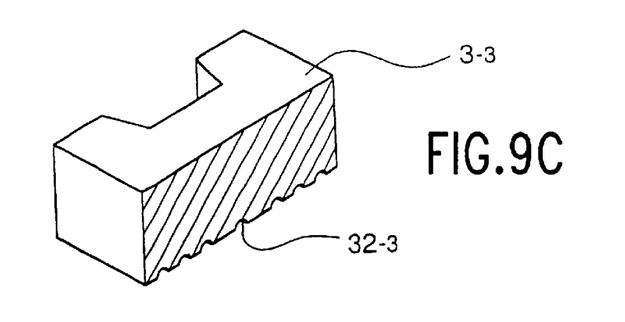
Figure 9D:
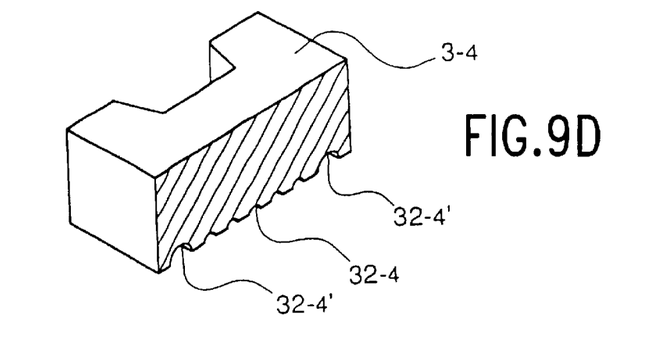

FIG. 8 shows an inhabitable structural body 25 comprising the structural body 10 in combination with the structural body 2 having substantially the same configuration as described above. As shown in FIG. 8, the structural bodies 10 are disposed together with the structural body 2 composed of the round timbers 2a, cobblestones 2c, and so on. The inhabitable structural body 25 may preferably be disposed so as for its one end to be directed to the flow direction of the water with its sides extending along and parallel to the flow of water and for the water to flow through the bamboo tubes constituting the inhabitable structural body 25. In the configuration of the riparian improvement structure as shown in FIG. 8, the blocks 3 are disposed on the round timbers 2a which in turn are disposed on the inhabitable structural body 25 on a bottom, shore, bank, etc. of a river, lake, sea, etc., in substantially the same manner as in the embodiments as described above.

It is to be understood herein that the shape and size, etc. of the grooves 32 on the bottom of the block 3 are not restricted to the particular ones as described above and the present invention encompasses any variations and modifications departing from the spirit and scope of the present invention.

FIG. 9 shows other examples of generally H-shaped blocks having different grooves. FIG. 9(a) shows a block 3-1 having sectionally wave-shaped grooves 32-1 disposed on the bottom thereof and extending parallel to the throughhole formed therein. FIG. 9(b) shows a block 3-2 having a combination of smaller-sized grooves 32-2 and larger-sized grooves 32-2' disposed in substantially the same manner as the block 3-1, the smaller-sized groove 32-2 being a U-lettered shape (for example, with its upper portion being wider than its lower portion) in section and the larger-sized groove 32-2' being a likewise U-lettered shape larger than the U-lettered shape of the smaller-sized groove 32-2. FIG. 9(c) shows a block 3-3 having grooves 32-3, each being semicircular or semi-oval in section. FIG. 9(d) shows a block 3-4 having a combination of smaller-sized grooves 32-4 and larger-sized grooves 32-4' disposed in substantially the same manner as the block 3-1, the smaller-sized groove 32-4 being of a semi-circular or semi-oval shape and the larger-sized groove 32-4' being of a semi-circular or semi-oval shape larger than the semi-circular or semi-oval shape of the smaller-sized groove 32-4. It is further to be understood herein that the number, size, etc. of the grooves formed on the bottom of the block 3 are not restricted to particular ones as described above and they may be selected appropriately depending upon the location of the block 3, etc.

Figure 10A:
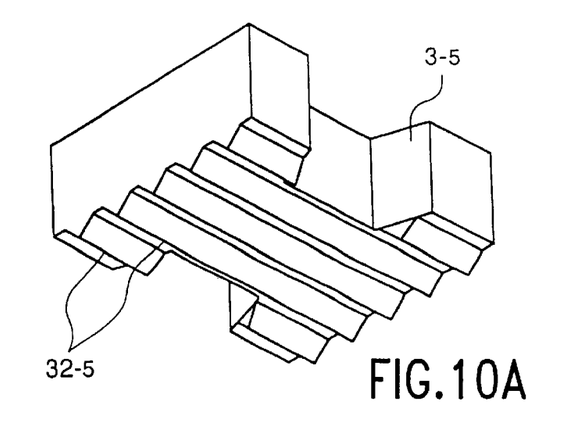
FIG. 10 is a perspective view showing other examples of blocks with grooves on the bottom surfaces thereof.
Figure 10B:
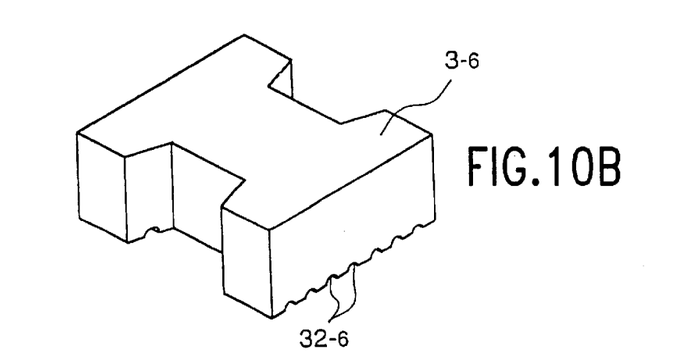
Figures 10C, 10D:
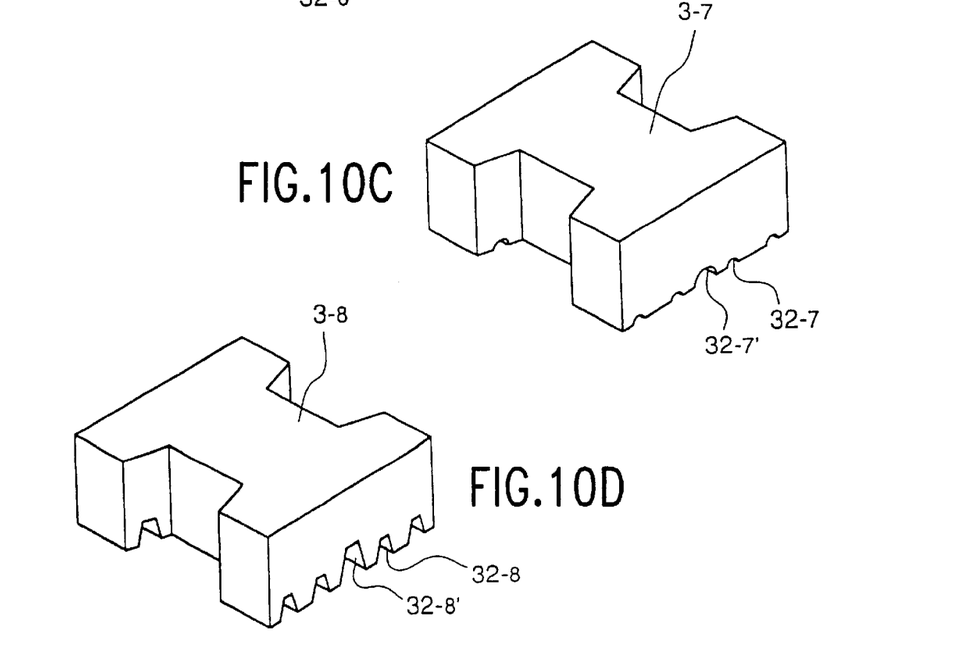

Further, FIG. 10 shows other examples of generally H-shaped grooves 32 on the bottom of the block 3. FIG. 10(a) shows a block 3-5 having plural rows of grooves 32-5, each groove being of a shape having an inverted V-shaped projection and a flat bottom portion extending from the foot of the inverted V-shaped projection and another inverted V-shaped projection protruding from the other end of the flat bottom portion and other projections arranged in substantially the same manner. As shown in FIG. 10(b), a block 3-6 has grooves 32-6, each being semi-circular or semi-oval in section and having substantially the same manner as described above. FIG. 10(c) shows a combination of smaller-sized grooves 32-7 with larger-sized grooves 32-7', the smaller-sized grooves 32-7 being each of a semi-circular or semi-oval shape and the larger-sized grooves 32-7' being each of a semi-circular or semi-oval shape larger than that of the smaller-sized groove 32-7. As shown in FIG. 10(d), a block 3-8 has a combination of smaller-sized grooves 32-8 with larger-sized grooves 32-8', the smaller-sized grooves 32-8 being each of a U-lettered shape with the upper portion wider in section than the lower portion thereof and the larger-sized grooves 32-8' being each of a similarly U-lettered shape larger than that of the smaller-sized groove 32-8. Like the grooves 32-1 to 32-4 of the blocks 3-1 to 3-4, respectively, it is further to be understood herein that the number, size, etc. of the grooves formed on the bottom of the block 3 as shown in FIG. 10 are not restricted to particular ones as described above and they may be selected appropriately depending upon the location of the block 3, etc.

The above description is directed to the blocks 3 having each a flat top surface. It is to be understood herein, however, that the present invention is not restricted to those blocks 3 as described above and encompasses any variations and modifications within the scope and spirit of the invention. FIGS. 11 to 14 shows examples of blocks 3 having different shapes and different configurations of the top surfaces and grooves 32.

Figure 11A:
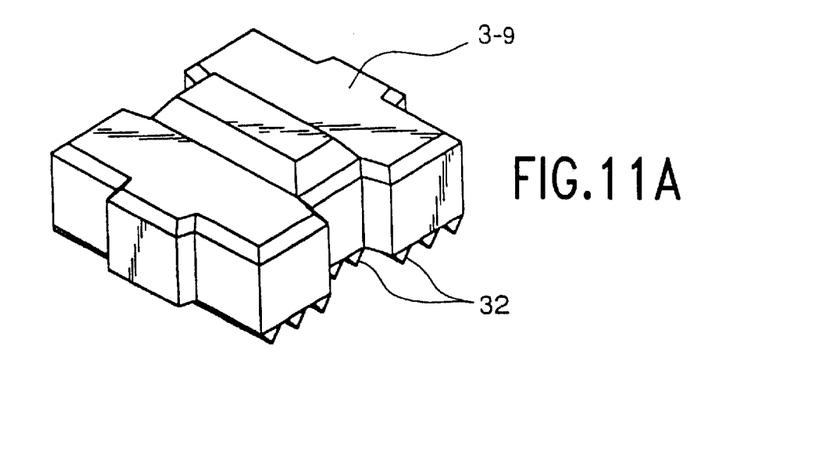
FIG. 11 is a perspective view showing other examples of blocks in accordance with the present invention.
Figure 11B:
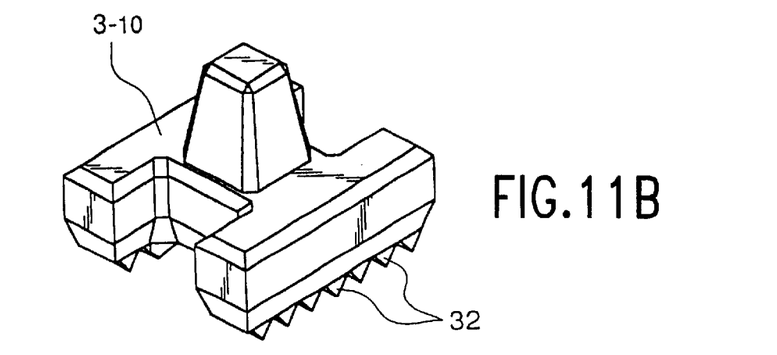
Figure 11C:
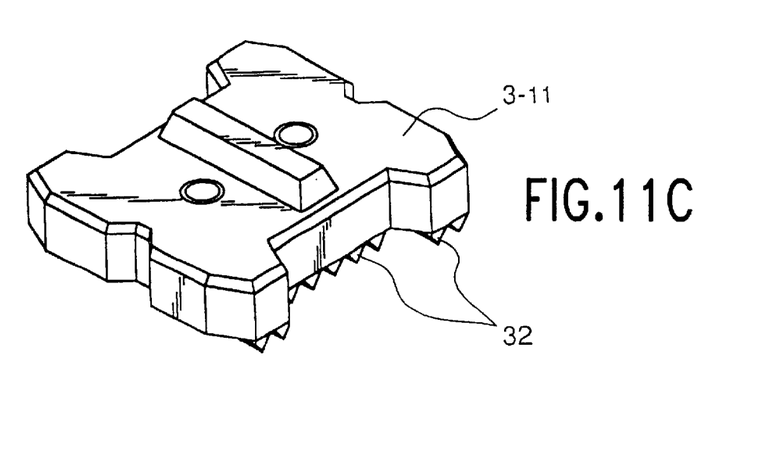

FIG. 11 shows other examples of generally H-shaped blocks 3-9 to 3-11 having grooves 32 on their bottoms. More specifically, FIG. 11(a) shows a block 3-9 having a top surface on which a projection having a flat top is formed at a central portion extending between the left-hand and right-hand depressed side portions thereof. Further, the block 3-9 is structured such that the top and bottom portions are each provided with a flat-top projection. FIG. 11(b) shows a block 3-10 having a top surface at a central portion thereof, the top surface being substantially the same configuration yet being higher than the projection of the block 3-9. As shown in FIG. 11 (c), a block 3-11 has a top surface with a flat-top projection disposed at a central portion thereof and with two through-holes disposed aside the projected central portion. Furthermore, the blocks 3-11 has a portion depressed or cut away on each of the top and bottom side portions.

Figure 12A:
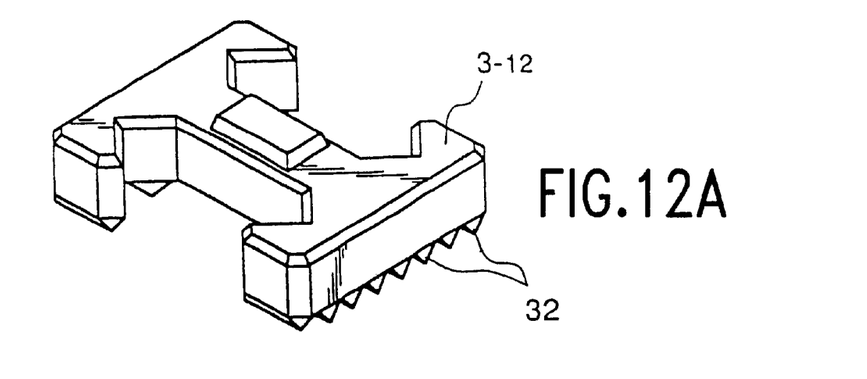
FIG. 12 is a perspective view showing further examples of blocks in accordance with the present invention.
Figure 12B:
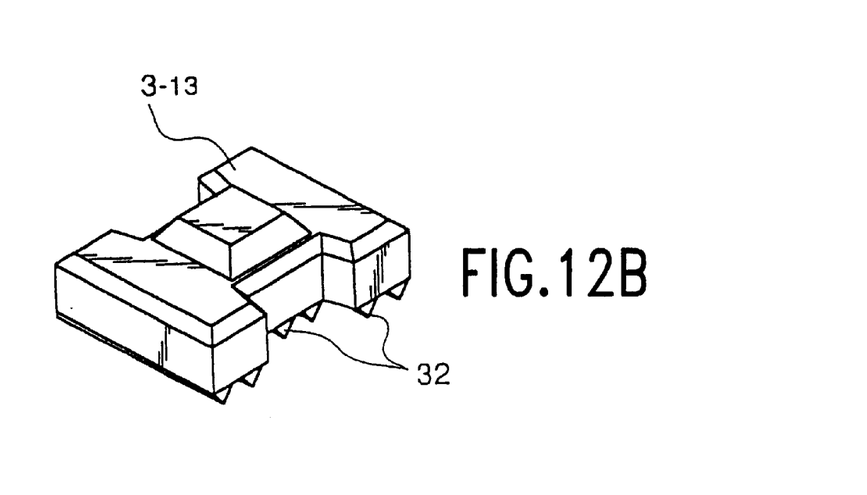
Figure 12C:
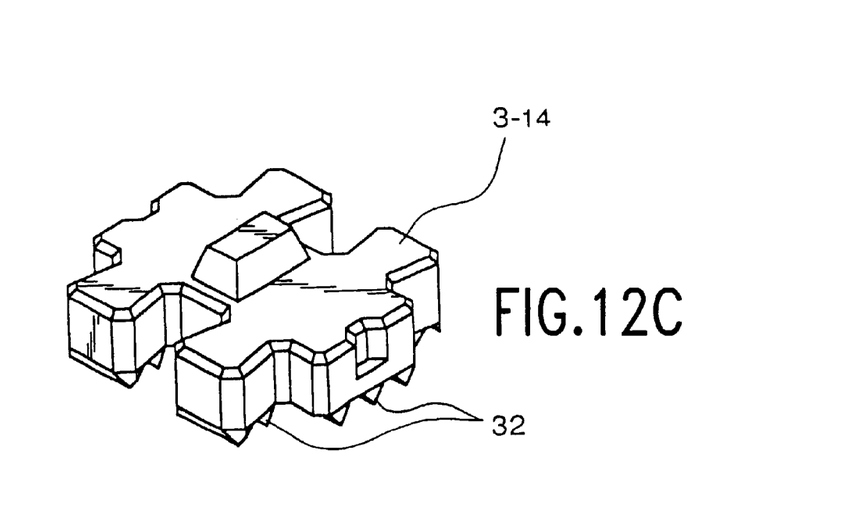

FIG. 12 shows other examples of generally H-shaped blocks 3 having grooves 32 disposed on the bottoms thereof. FIG. 12(a) shows a block 3-12 having a top-flat projection at the central portion thereof The block 3-12 has its depressed portions each formed in an angled C-letter shape. FIG. 12(b) shows a block 3-13 having a top-flat projection at the central portion thereof As shown in FIG. 12(c), a block 3-14 is in a generally H-shaped form having a top-flat projection at the central portion thereof and having a projection at each of the top and bottom side portions thereof. The projection may be in a generally W-lettered or M-lettered shape and the projection may further be provided with a consecutively depressed or cut-away section on each of the top and bottom thereof.

Figure 13A:
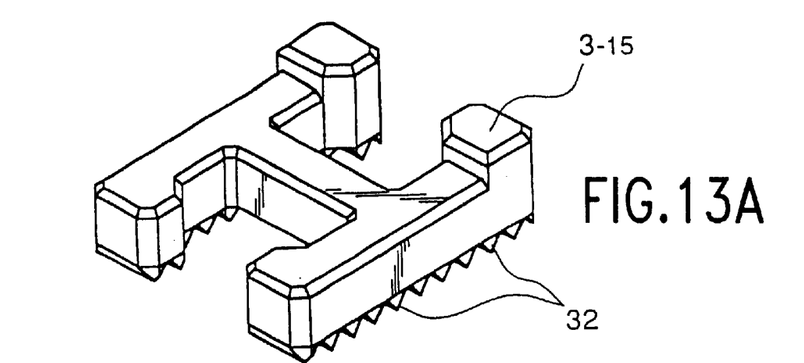
FIG. 13 is a perspective view showing still further examples of blocks in accordance with the present invention.
Figure 13B:
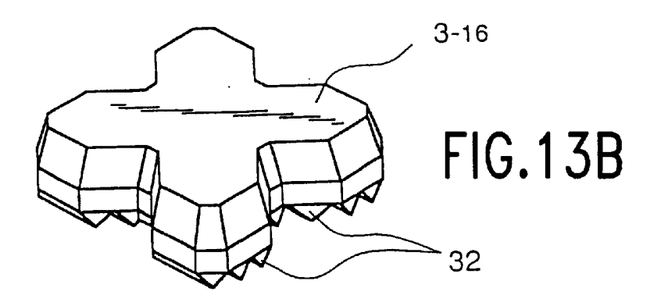
Figure 13C:
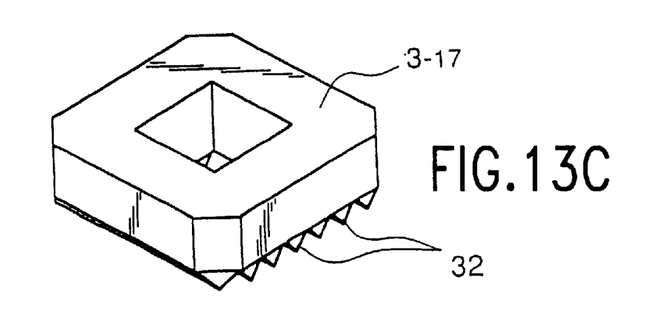

Further, FIG. 13 shows other examples of blocks 32 having grooves 32 on the bottom thereof. As shown in FIG. 13(a), a generally H-shaped block 3-15 has a top-flat projection at the one end of each of the left-hand and right-hand side bar portions constituting the H-shaped block and it has the other end thereof curved slightly toward the inside. FIG. 13(b) shows a generally X-shaped block 3-16 having grooves disposed on the bottom thereof, and the X-shaped block 3-16 has its side edge cut or beveled at a given angle. FIG. 13(c) shows a generally squared block 3-17 having grooves 32 on its bottom, and the squared block 3-17 has its top surface flattened and has a squared hole at its central portion.

Figure 14A:
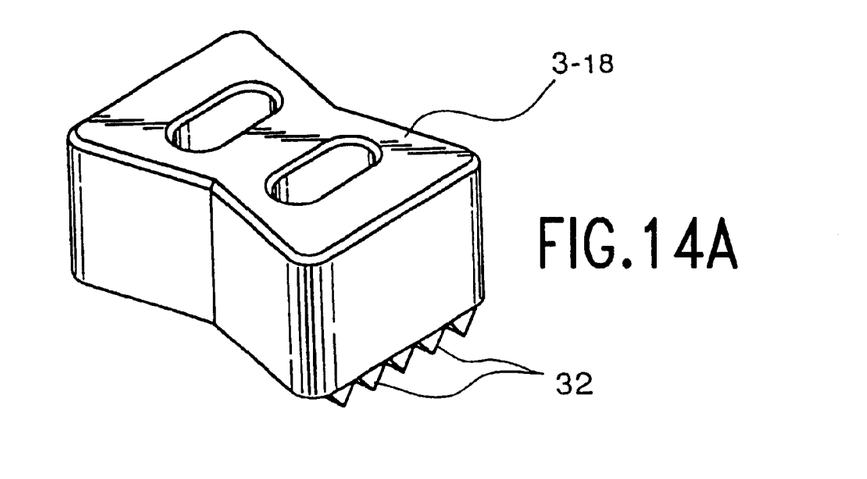
FIG. 14 is a perspective view showing still further examples of blocks in accordance with the present invention.
Figure 14B:
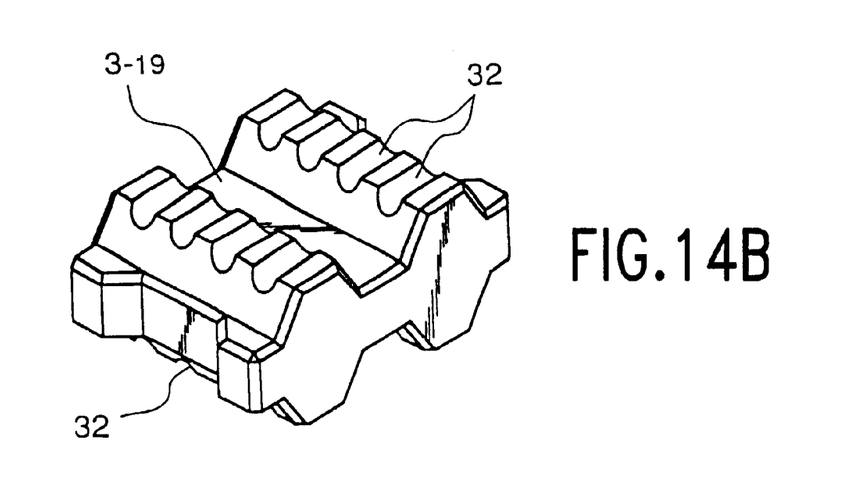

Moreover, FIG. 14 shows other examples of blocks 3. FIG. 14(a) shows a generally I-shaped block 3-18 having grooves 32 on the bottom thereof and having its side portions inclined inward from each of the top and bottom ends. Furthermore, the block 3-18 has two through-holes at each of the upper and lower portions. FIG. 14(b) shows a generally double +-shaped block 3-19 having grooves 32 on each of the top and bottom portions of the double +-shaped, longitudinally extending bar sections. Furthermore, each of the latitudinally extending bar section has each of its left-hand and right-hand side portions inclined upwardly and downwardly at a given angle from the central portion and its top and bottom side portions provided with the grooves 32. Moreover, the latitudinal bar section has a portion of each of the both sides cut-away or depressed.

It is to be understood herein that the block 3 is not restricted to the side, shape, etc. as described above and that the present invention encompasses any modifications and variations within the scope and spirit of the invention as long as the block 3 can achieve the objects of the present invention.

EFFECTS OF THE INVENTION

The riparian improvement structure according to the present invention comprises a combination of the blocks with the structural body or bodies disposed on a bottom, shore, bank, etc. of a river, lake, sea, etc. in a manner as described above, which provides a good environment that is suitable for habitation and/or growth of aquatic life such as fish, crustaceans, e.g., crabs, shrimps, aquatic insects, aquatic plants, etc., while protecting or controlling a riverbed, shore, bank, etc. of a river, lake, sea, etc. The block for use with the structural body or bodies in accordance with the present invention is formed in a shape suitable for such aquatic life to live in, lay eggs, escape or grows, etc. Further, the block is provided with a through-hole therein through which fresh water flows and passes and the structural body or bodies is supplied with the fresh water in order to provide an environment suitable for the habitation and/or growth of aquatic life. Moreover, the riparian area of a river, lake, sea, etc. can be protected by placing the blocks on the structural body or bodies as a weight that can prevent the structural body or bodies from being carried or washed away by a rapid stream of water, high tide, etc. Therefore, the riparian area of the river, lake, sea, etc. can stay in a natural state even after river improvement, etc. by laying the blocks and the structural body or bodies on a river-bed, shore, bank, etc. of the river, lake, sea, etc.

When the blocks are disposed on a river-bed, shore, bank, etc. of a river, lake, sea, etc. and the structural body or bodies is or are superimposed on the blocks, this structure of the riparian improvement structure according to the present invention can also accomplish foot protection, shore and bank protection, wave breaking control, water control, etc., as well as ensure a good environment suitable for habitation and/or growth of aquatic life.

The riparian improvement structure according to the present invention can provide a large number of spaces inhabitable for aquatic life under or above the blocks by laying the structural body or bodies each consisting of a combination of plural wooden materials and/or mass bodies on the riparian area of a river, lake, sea, etc. or on the blocks.

Further, the riparian improvement structure according to the present invention is disposed in the riparian area of a river, lake, sea, etc. so as for the through-holes formed in the blocks to be directed to a stream of water of the river, lake, sea, etc. and for the water to pass or flow through the through-holes to supply the structural body or bodies with a fresh water containing a large amount of dissolved oxygen that is essential for aquatic life, thereby promoting the metabolism of water within the structural body or bodies and, at the same time, realizing an environment suitable for habitation and/or growth of aquatic life such as fish, crustaceans, e.g., crabs, shrimps, aquatic insects, aquatic plants, etc.

Moreover, the blocks are provided with grooves through which water can pass or flow and they are disposed with the grooves facing downward in the riparian area of a river, lake, sea, etc. so as for water to pass or flow through the grooves. Therefore, the blocks can supply the structural body or bodies or the riparian area with a fresh water containing a high concentration of dissolved oxygen through the grooves formed on the bottom of the blocks, thereby accelerating the metabolism of water in the riparian improvement structure and providing an inhabitable environment suitable for aquatic life.

Furthermore, the blocks are disposed in a relationship spaced in a given distance providing a space between the adjacent blocks, and the space can also act as a water passage through which a fresh water passes or flows. This disposition of the blocks can also serve as an environment suitable for the habitation and/or growth of aquatic life such as fish, crustaceans, e.g., crabs, shrimps, aquatic insects, etc., and suitable for aquatic plants, etc.

The blocks are further disposed in an integrally connected state on the structural body or bodies or a river-bed, shore, bank, etc. of a river, lake, sea, etc. so that the riparian improvement structure according to the present invention can accomplish foot protection, bank and shore protection, wave control, water control, etc. of the river, lake, sea, etc. even after the structural body or bodies has or have been broken or decayed. Moreover, the blocks can act as an inhabitable place for aquatic life by or in themselves, so that the function of the blocks as an inhabitable place for aquatic life can be kept for a prolonged period of time, in addition to foot protection, bank and shore protection, wave control, water control, etc. of the river, lake, sea, etc.

What is claimed is:

1. A riparian improvement structure for protection of a riparian area of a river, lake, sea or other body of water, and for protection of an ecological system suitable for habitation or growth of aquatic life comprising:
   a plurality of blocks having a plurality of grooves formed on a bottom of each of
   said plurality of blocks so as to allow water to flow therethrough in a given direction; and
   a structural body,
wherein said structural body is disposed on said riparian area of said river, lake, sea or other body of water; and wherein said plurality of blocks are disposed on said structural body.

2. The riparian improvement structure according to claim 1, wherein each of said plurality of blocks further comprises a through-hole formed so as to allow water to flow therethrough in a given direction.

3. The riparian improvement structure according to claim 2, wherein said plurality of blocks are disposed so as to allow water to flow through said water passage along a water direction of said river, lake, sea or other body of water in a state in which said plurality of blocks are laid in said riparian area of said river, lake, sea or other body of water.

4. The riparian improvement structure according to claim 3, wherein said water passage comprises a plurality of grooves formed on a bottom of each of said plurality of blocks.

5. The riparian improvement structure according to claim 3, wherein said water passage comprises a through-hole in each of said plurality of blocks.

6. The riparian improvement structure according to claim 2, wherein said plurality of blocks are disposed in a spaced relationship so as to form a space between adjacent blocks, said space being suitable for water to flow therethrough.

7. The riparian improvement structure according to claim 6, wherein said through-hole formed in each of said plurality of blocks is open communicating with said space formed between said adjacent blocks.

8. The riparian improvement structure according to claim 2, wherein said plurality of blocks are connected to one another so as for the adjacent blocks to be variable in position respective to each other.

9. The riparian improvement structure according to claim 1, wherein said structural body comprises a plurality of wooden materials disposed so as to form a number of spaces in which aquatic life lives or grows.

10. The riparian improvement structure according to claim 1, wherein said structural body comprises a plurality of mass materials disposed in a spaced relationship so as to provide a number of spaces in which aquatic life lives or grows.

11. The riparian improvement structure according to claim 11, wherein said plurality of blocks are disposed so as to allow water to flow through said water passage along a water direction of said river, lake, sea or other body of water in a state in which said plurality of blocks are laid in said riparian area of said river, lake, sea or other body of water.

12. The riparian improvement structure according to claim 11, wherein said water passage comprises a plurality of grooves formed on a bottom of each of said plurality of blocks.

13. The riparian improvement structure according to claim 11 wherein said plurality of blocks are disposed in a spaced relationship so as to form a space between adjacent blocks, said space being suitable for water to flow therethrough.

14. The riparian improvement structure according to claim 1, wherein said plurality of blocks are connected to one another so as for the adjacent blocks to be variable in position respective to each other.

15. A riparian improvement structure for protection of a riparian area of a river, lake, sea or other body of water, and for protection of an ecological system suitable for habitation or growth of aquatic life comprising:
   a plurality of blocks having a plurality of grooves formed on a bottom of each of
   said plurality of blocks so as to allow water to flow therethrough in a given direction; and
   a structural body,
wherein said plurality of blocks are disposed on said riparian area of said river, lake, sea or other body of water; and wherein said structural body is disposed on said plurality of blocks.

16. The riparian improvement structure according to claim 15, wherein each of said plurality of blocks further comprises a through-hole formed so as to allow water to flow therethrough in a given direction.

17. The riparian improvement structure according to claim 16, wherein said plurality of blocks are disposed so as to allow water to flow through said water passage along a water direction of said river, lake, sea or other body of water in a state in which said plurality of blocks are laid in said riparian area of said river, lake, sea or other body of water.

18. The riparian improvement structure according to claim 17, wherein said water passage comprises a plurality of grooves formed on a bottom of each of said plurality of blocks.

19. The riparian improvement structure according to claim 17, wherein said water passage comprises a through-hole in each of said plurality of blocks.

20. The riparian improvement structure according to claim 16, wherein said plurality of blocks are disposed in a spaced relationship so as to form a space between adjacent blocks, said space being suitable for water to flow therethrough.

21. The riparian improvement structure according to claim 20, wherein said through-hole formed in each of said plurality of blocks is open communicating with said space formed between said adjacent blocks.

22. The riparian improvement structure according to claim 16, wherein said plurality of blocks are connected to one another so as for the adjacent blocks to be variable in position respective to each other.

23. The riparian improvement structure according to claim 15, wherein said structural body comprises a plurality of wooden materials disposed so as to form a number of spaces in which aquatic life lives or grows.

24. The riparian improvement structure according to claim 15, wherein said structural body comprises a plurality of mass materials disposed in a spaced relationship so as to provide a number of spaces in which aquatic life lives or grows.

25. The riparian improvement structure according to claim 15, wherein said plurality of blocks are disposed so as to allow water to flow through said water passage along a water direction of said river, lake, sea or other body of water in a state in which said plurality of blocks are laid in said riparian area of said river, lake, sea or other body of water.

26. The riparian improvement structure according to claim 25, wherein said water passage comprises a plurality of grooves formed on a bottom of each of said plurality of blocks.

27. The riparian improvement structure according to claim 15, wherein said plurality of blocks are disposed in a spaced relationship so as to form a space between adjacent blocks, said space being suitable for water to flow therethrough.

28. The riparian improvement structure according to claim 15, wherein said plurality of blocks are connected to one another so as for the adjacent blocks to be variable in position respective to each other.

* * * * *